US009973596B2

(12) United States Patent
Hui et al.

(10) Patent No.: US 9,973,596 B2
(45) Date of Patent: May 15, 2018

(54) DYNAMICALLY ADJUSTING FRAME MTU TO SUPPORT LOW-LATENCY COMMUNICATION

(71) Applicant: Cisco Technology, Inc., San Jose, CA (US)

(72) Inventors: Jonathan W. Hui, Belmont, CA (US); Jean-Philippe Vasseur, Saint Martin d'Uriage (FR)

(73) Assignee: Cisco Technology, Inc., San Jose, CA (US)

(*) Notice: Subject to any disclaimer, the term of this patent is extended or adjusted under 35 U.S.C. 154(b) by 361 days.

(21) Appl. No.: 13/921,651

(22) Filed: Jun. 19, 2013

(65) Prior Publication Data

US 2014/0376427 A1    Dec. 25, 2014

(51) Int. Cl.
*H04L 29/06* (2006.01)
*H04L 5/16* (2006.01)
(Continued)

(52) U.S. Cl.
CPC ............... *H04L 69/04* (2013.01); *H04L 5/16* (2013.01); *H04L 47/24* (2013.01); *H04L 47/245* (2013.01); *H04L 47/365* (2013.01)

(58) Field of Classification Search
CPC ......... H04L 5/16; H04L 69/04; H04L 47/245; H04L 47/365; H04L 47/24
See application file for complete search history.

(56) References Cited

U.S. PATENT DOCUMENTS 6,215,789 B1 * 4/2001 Keenan ............... H04L 12/413
370/395.53
6,650,652 B1 * 11/2003 Valencia ............... H04L 47/10
370/352
(Continued)

FOREIGN PATENT DOCUMENTS

EP        2 477 364 A1    7/2012
WO        WO 95/12265 A1  5/1995

OTHER PUBLICATIONS

TechTerms, Full-Duplex, http://techterms.com/definition/full-duplex, Apr. 5, 2012.*
(Continued)

*Primary Examiner* — Noel R Beharry
*Assistant Examiner* — Rodrick Mak
(74) *Attorney, Agent, or Firm* — Parker Ibrahim & Berg LLP; James M. Behmke; Stephen D. LeBarron

(57) ABSTRACT

In one embodiment, a sender in a shared-communication network determines whether a pending frame is low-latency or high-throughput, and sets a maximum transmission unit (MTU) of the pending frame as a first MTU in response to a low-latency frame and a longer second MTU in response to a high-throughput frame. In another embodiment, a receiver receives a data frame from a sender according to an MTU, and determines a trigger for adjusting the MTU based on latency requirements. In response to the trigger, the receiver sets an interrupt flag in a link-layer acknowledgment for the received data frame. In still another embodiment, a sender determines a pending low-latency data frame to send to a receiver operating according to an MTU, and sends a control message to the receiver to indicate the pending low-latency data frame and an adjusted MTU.

20 Claims, 11 Drawing Sheets

(51) Int. Cl.
*H04L 12/851* (2013.01)
*H04L 12/805* (2013.01)

(56) References Cited

U.S. PATENT DOCUMENTS

| | | | |
|---|---|---|---|
| 6,707,821 B1 | 3/2004 | Shaffer et al. | |
| 6,934,768 B1* | 8/2005 | Block | H04L 69/16 709/228 |
| 7,551,603 B1 | 6/2009 | Shaffer et al. | |
| 7,630,393 B1 | 12/2009 | Valencia | |
| 7,633,869 B1* | 12/2009 | Morris | H04L 41/0896 370/232 |
| 7,680,047 B2 | 3/2010 | Vadlakonda et al. | |
| 7,697,524 B2 | 4/2010 | Subramanian et al. | |
| 7,729,259 B1 | 6/2010 | Faulkner et al. | |
| 7,738,495 B2 | 6/2010 | Dalal et al. | |
| 2003/0016770 A1* | 1/2003 | Trans et al. | 375/346 |
| 2003/0115358 A1* | 6/2003 | Yun | G06F 9/54 709/238 |
| 2004/0015602 A1* | 1/2004 | Goldhammer | H04L 12/5695 709/235 |
| 2004/0071140 A1* | 4/2004 | Jason | H04L 47/10 370/392 |
| 2004/0264433 A1* | 12/2004 | Melpignano | H04L 29/06 370/349 |
| 2005/0018703 A1* | 1/2005 | Blasco Claret | H04J 3/1694 370/432 |
| 2007/0230344 A1* | 10/2007 | Hua et al. | 370/235 |
| 2007/0254692 A1* | 11/2007 | McCoy | 455/553.1 |
| 2008/0212504 A1* | 9/2008 | Venkataraman et al. | 370/310 |
| 2009/0234996 A1* | 9/2009 | Bugenhagen | H04L 41/5003 710/105 |
| 2010/0014415 A1* | 1/2010 | Moeller | H04L 12/2856 370/216 |
| 2010/0150150 A1* | 6/2010 | Paz | H04L 47/24 370/389 |
| 2011/0058547 A1* | 3/2011 | Waldrop et al. | 370/389 |
| 2011/0243063 A1* | 10/2011 | Kuningas | 370/328 |
| 2011/0305143 A1* | 12/2011 | Gray | H04L 45/02 370/242 |
| 2011/0321039 A1* | 12/2011 | De Leon, III | H04L 12/4641 718/1 |
| 2013/0051406 A1* | 2/2013 | Bugge | H04L 12/6418 370/475 |
| 2013/0128902 A1* | 5/2013 | Ilan | 370/477 |
| 2013/0242802 A1* | 9/2013 | Qian et al. | 370/254 |
| 2014/0250237 A1* | 9/2014 | Shama et al. | 709/232 |
| 2014/0269277 A1* | 9/2014 | DeCusatis et al. | 370/230 |

OTHER PUBLICATIONS

TechTerms, Half-Duplex, http://techterms.com/definition/half-duplex, Apr. 5, 2012.*
Montenegro, et al., "Transmission of IPv6 Packets Over IEEE 802.15.4 Networks", Request for Comments 4944, Sep. 2007, 30 pages, Internet Engineering Task Force.
Winter; et al., "RPL: IPv6 Routing Protocol for Low-Power and Lossy Networks", Request for Comments 6550, Mar. 2012, 157 pages, Internet Engineering Task Force.
International Search Report dated Oct. 21, 2014 issued in connection with PCT/US2014/043286.

* cited by examiner

DYNAMICALLY ADJUSTING FRAME MTU TO SUPPORT LOW-LATENCY COMMUNICATION

TECHNICAL FIELD

The present disclosure relates generally to computer networks, and, more particularly, to frame MTU (maximum transmission unit) for low-latency communication.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. Many LLN link technologies use Carrier Sense Multiple Access with Collision Avoidance (CSMA/CA) for media access, which has the benefits of being very flexible to varying traffic demands within the networks.

A significant challenge with CSMA/CA is its relatively high per-packet overhead. In particular, to perform collision avoidance, a transmitter must wait a minimum inter-frame spacing delay along with an additional random backoff delay to contend for the channel. To help reduce the per-packet overhead, LLN technologies have been turning towards larger frame sizes (maximum transmission units or "MTUs") to amortize the cost of acquiring a channel over larger amounts of data, thus increasing the overall throughput of the system. However, while larger packet sizes can improve the overall throughput of the system, they can also significantly hinder the communication latency, since only one device may transmit to a given receiver at a time a shared communication medium.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
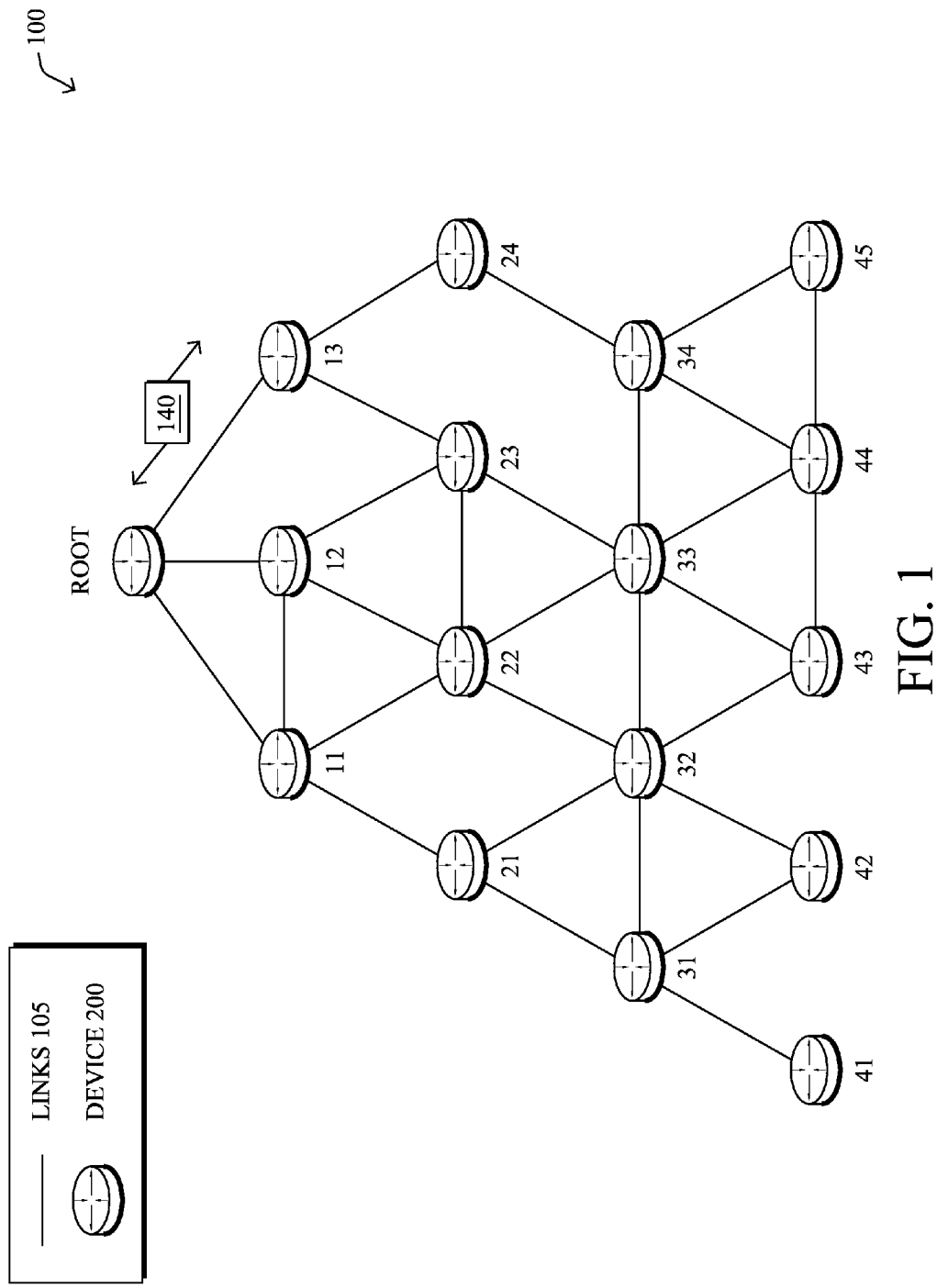
FIG. 1 illustrates an example communication network.

According to one or more embodiments of the disclosure, a sender in a shared-communication network determines whether a pending frame is low-latency or high-throughput, and sets a maximum transmission unit (MTU) of the pending frame as a first MTU in response to a low-latency frame and a second MTU in response to a high-throughput frame, where the first MTU is shorter than the second MTU. The sender then transmits the pending frame to a receiver at the set MTU.

According to one or more additional embodiments of the disclosure, a receiver receives a data frame from a sender over a shared-communication network, the frame sent according to an MTU, and the receiver determines a trigger for adjusting the MTU based on latency requirements. In response to the trigger, the receiver sets an interrupt flag in a link-layer acknowledgment for the received data frame, and replies to the sender with the link-layer acknowledgment and interrupt flag.

According to one or more additional embodiments of the disclosure, a sender determines a pending low-latency data frame to send to a receiver over a shared-communication network, the receiver operating according to an MTU, and sends a control message to the receiver to indicate the pending low-latency data frame and an adjusted MTU (e.g., in response to the receiver currently receiving a transmission from a remote sender). In response to receiving an acknowledgment for the received control message, the sender then sends the low-latency data frame to the receiver at the adjusted MTU.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
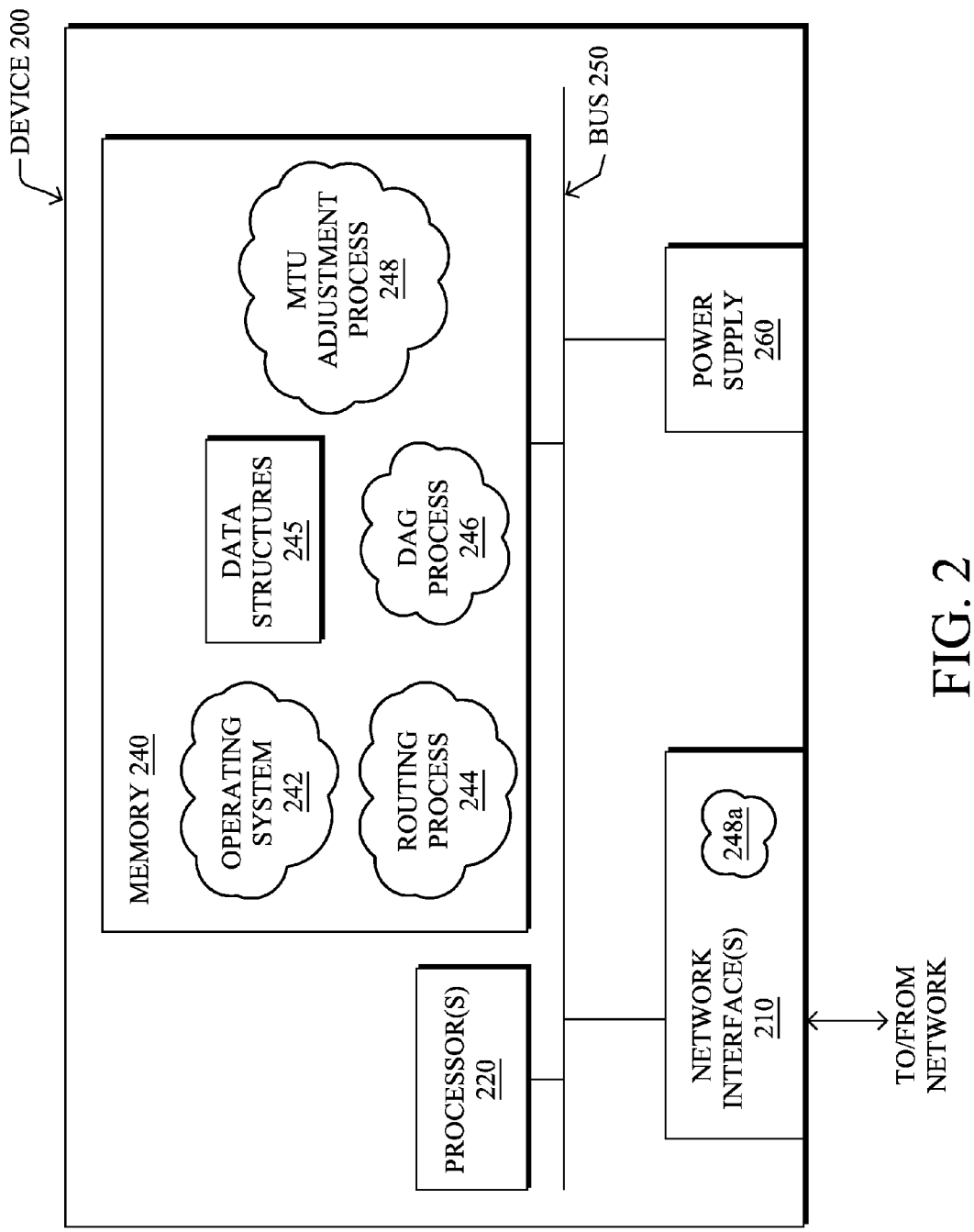
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise routing process/services 244 (and optionally a directed acyclic graph (DAG) process 246), and an illustra-tive MTU adjustment process 248, as described herein. Note that while MTU adjustment process 248 is shown in centralized memory 240, alternative embodiments provide for the process to be specifically operated within the network interfaces 210 (process "248a").

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by DAG process 246 and/or routing process 244) based on an Objective Function (OF). The role of the Objective Function is generally to specify rules on how to build the DAG (e.g. number of parents, backup parents, etc.).

LLN link technologies typically use either Carrier Sense Multiple Access with Collision Avoidance (CSMA/CA) or Time Division Multiple Access (TDMA) for media access. CSMA/CA has the benefits of being very flexible to varying traffic demands within the networks. Because any node can attempt to transmit at any time, CSMA/CA allows any individual node to consume nearly all the channel capacity while they have data to send. The challenge with CSMA/CA is that devices must contend for the channel. When multiple devices have data to send at the same time, the efficiency of the network decreases dramatically. Unlike CSMA/CA, TDMA assigns specific time slots for each transmitter-receiver pair. By assigning time slots, TDMA can avoid any overhead caused by contention and allows the network to consume nearly all the channel capacity even when multiple devices have data to send. However, because TDMA assigns time slots to each transmitter, any unused channel capacity by a transmitter cannot be easily used by other devices. Furthermore, TDMA requires significant signaling overhead to allocate and manage time slots between transmitter-receiver pairs.

Certain LLNs have chosen to use CSMA/CA to maximize flexibility in supporting a multi-service architecture. For instance, while Automated Meter Reading (AMR) may have predictable traffic flows, other Smart Grid AMI applications often have unpredictable traffic flows. For example, on-demand meter reads, demand-response, outage detection and restoration, and Distribution Automation (DA), typically generate traffic triggered by external events rather than a periodic timer. Reducing access to a channel is therefore specifically critical for urgent/delay sensitive traffic. Furthermore, not only do nodes have to communicate with each other, but paths in the mesh are often required to support bounded delays. As an example, an LLN customer may require strict per-hop communication delay requirements of less than some set amount, e.g., 40 ms.

As noted above, a significant challenge with CSMA/CA is its relatively high per-packet overhead. In particular, to perform collision avoidance, a transmitter must wait a minimum inter-frame spacing delay along with an additional random backoff delay to contend for the channel. In very dense networks where periods of high contention may occur, these random backoff delays can grow large to minimize the likelihood of collisions. As such, supporting bounded delays is a challenge for LLN architectures.

To help reduce the per-packet overhead, LLN technologies have been turning towards larger frame sizes (maximum transmission units or "MTUs"). For example, while IEEE 802.15.4-2003 originally specified a frame MTU of 127 bytes, IEEE 802.15.4g-2012 (a PHY amendment targeted at Smart Utility Networks) now specifies a frame MTU of 2047 bytes. By using larger frame sizes, the cost of acquiring a channel is amortized over larger amounts of data and increases the overall throughput of the system. Because large frame sizes increase the likelihood that bit-errors will occur, 802.15.4g also includes an optional Forward Error Correction mechanism that further increases the packet size.

While larger packet sizes can improve the overall throughput of the system, they can also significantly hinder the communication latency. Because devices communicate on a shared medium, only one device may transmit to a given receiver at a time. When using the full 2047 byte MTU offered by 802.15.4g at 75 kbits/sec, a single packet may consume the channel for a potentially unacceptable 218 ms.

Dynamic MTU Adjustment

According to one or more embodiments of the disclosure as described in detail below, the techniques herein dynamically adjust the frame MTU based on the latency requirements of flows that a device or a neighboring device may be servicing (e.g., the presence of critical low-latency flows), thus trading between throughput and latency based on the applications that the LLN is supporting. Because typical LLN link technologies cannot effectively interrupt transmissions, the communication latency is bounded by the frame MTU. The techniques herein dynamically reduce the frame MTU when low-latency traffic exists, reducing overall throughput when required. Conversely, the techniques herein dynamically increase the frame MTU when low-latency traffic does not exist, increasing minimum latency.

In particular, the techniques herein not only allow a sender to select the MTU based on the kind of packet it is about to send, but also limit the MTU of packets sent to a node based on the kind of packets that the receiving node may receive around the same time. In other words, the techniques herein may limit the transmission MTU based on the kind of packets that may be received by any neighboring device that is listening on the same channel (i.e., sharing the same media) at a given time, since once a device begins transmitting, no other device can utilize the same media to communicate to any neighboring device. Reducing the MTU ensures that the medium becomes available more quickly.

Accordingly, a device may set the MTU for packets it transmits based on any neighboring device (e.g., in its neighbor table) that may be receiving on the same channel at the same time. Also, in certain embodiments described herein, receivers may utilize a newly defined 'interrupt' flag in link-layer acknowledgments to interrupt a transmitter between frames. Further, using a newly defined control message, a device may indicate to a receiver that it has latency-critical traffic pending. Finally, input to adjust the frame MTU may come from either a central management device or may be locally determined based on observed traffic or control messages between the source and destination of flows.

Illustratively, the techniques described herein may be performed by hardware, software, and/or firmware, such as in accordance with the MTU adjustment process 248/248a, which may contain computer executable instructions executed by the processor 220 (or independent processor of interfaces 210) to perform functions relating to the techniques described herein. For example, the techniques herein may be treated as extensions to conventional protocols, such as the various communication protocols or wireless communication protocols that manage MTU size, and as such, may be processed by similar components understood in the art that execute those protocols, accordingly.

Operationally, the techniques herein provide a dynamic mechanism that trades between throughput and latency, in the presence of critical flows. The techniques herein dynamically adjust the frame MTU to optimize for throughput or latency. By increasing the frame MTU, the overall throughput increases because the per-packet transmission overhead is amortized over larger chunks of data. By decreasing the frame MTU, the overall latency decreases because the maximum amount of time a single packet may consume the channel also decreases. The techniques herein adjust the frame MTU depending on the particular flows that are being serviced (either by the source device, or more particularly by neighboring devices that may be attempting to transmit a message at the same time).

Note that changing the *frame* MTU is not the same as the *link* MTU. IPv6 requires a minimum link MTU of 1280 bytes. The 6LoWPAN adaptation layer (RFC 4944) provides a fragmentation mechanism that can fragment IPv6 datagrams across multiple frames. RFC 4944 was originally designed for IEEE 802.15.4-2003, which had 127 byte frame MTUs and does not specify a minimum frame size per 6LoWPAN fragment. The introduction of IEEE 802.15.4g-2012 allows greater flexibility by supporting a frame MTU of 2047 bytes.

Figure 3:
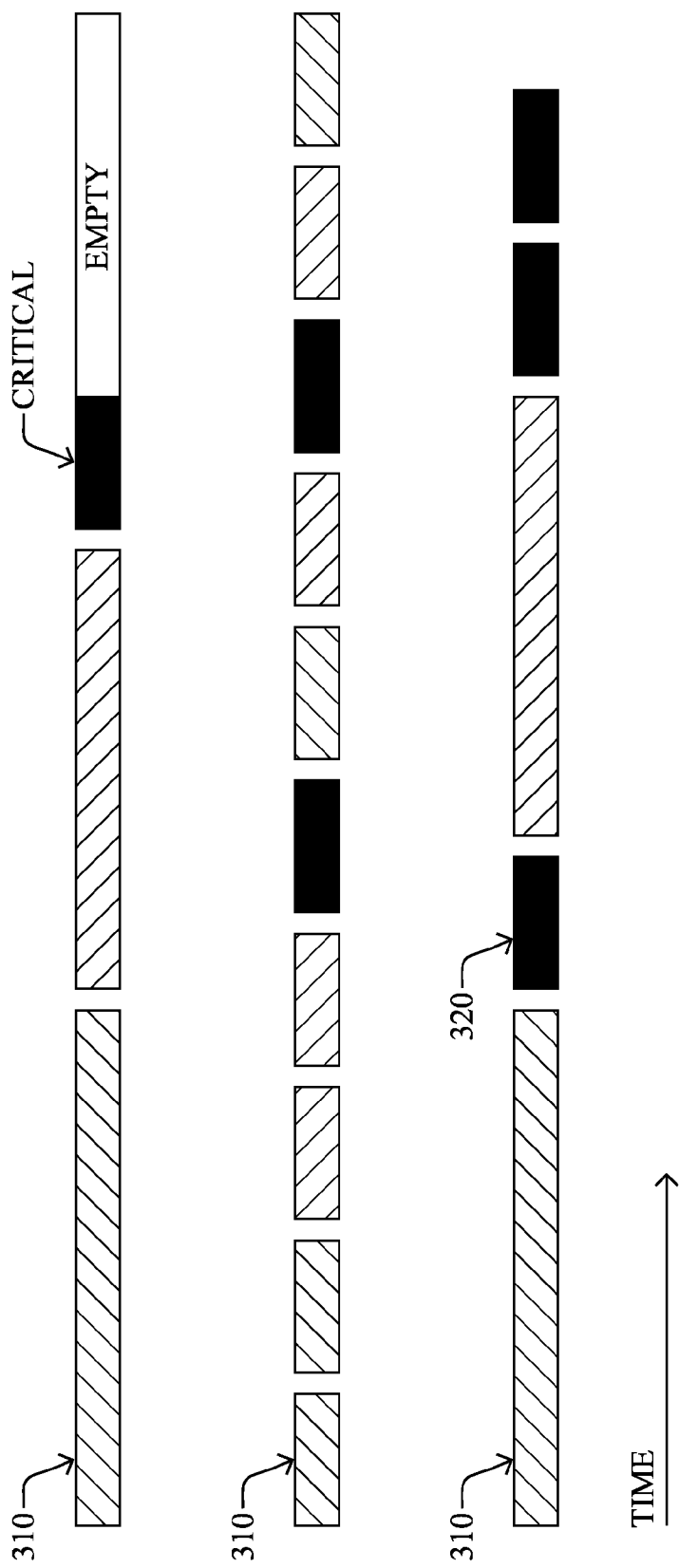
FIG. 3 illustrates an example of different maximum transmission units (MTUs)

A first aspect of the techniques herein involves dynamically adjusting the frame MTU to limit the duration that the shared media is used for a single transmission. That is, the techniques herein adjust the frame MTU to limit the amount of time that a single transmission may occupy the channel, should high priority data be waiting for transmission. FIG. 3 illustrates the concept of high-throughput (longer) MTU frames 310 and how long low-latency (critical) frame may take to be transmitted (and the empty space), low-latency (shorter) MTU frames 320 and how different high-throughput data may take longer to be fully received given the contention noted above, and mixed MTU frames (adjusted MTU) as described herein, accordingly.

Figure 4A:
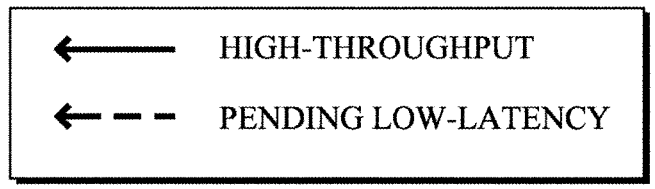
FIGS. 4A-4C illustrate examples of node communication.
Figure 4A:
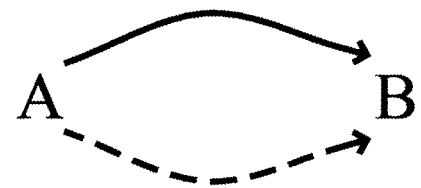

There are a number of scenarios where having a smaller frame MTU improves overall latency, with references to FIGS. 4A-4C below:

1) As shown in FIG. 4A, in the case of A->B, when node A starts transmitting a frame to B, it cannot simply interrupt the existing transmission and start a new one to B. The problem is that B has already synchronized to the first frame and is committed to receiving the full length of the frame. This case occurs when node A sources its own critical low-latency traffic while forwarding other packets.

Figure 4B:
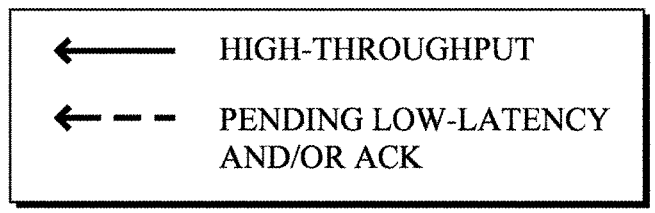
Figure 4B:

2) As shown in FIG. 4B, in the case of A<->B, when A is transmitting to B, B must wait for A to finish its transmission before sending anything back to A. Reducing the frame MTU also reduces the maximum amount of time B must wait before transmitting anything to A. This case occurs when communicating packets in different directions across the same link.

Figure 4C:
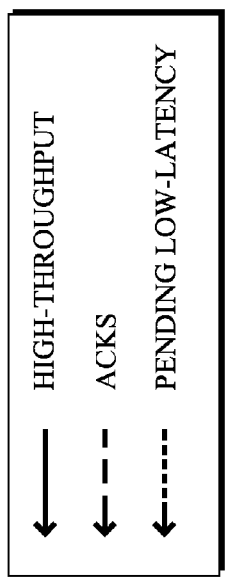
Figure 4C:
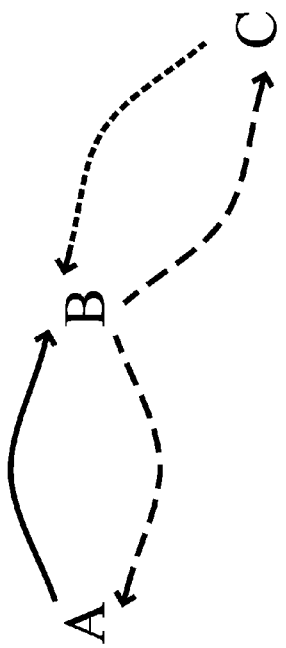

3) As shown in FIG. 4C, in the case of A->B<-C, when A is transmitting to B, C must wait for A to finish its transmission before sending anything to B. Reducing the frame MTU also reduces the maximum amount of time C must wait before transmitting anything to B. This case occurs when two distinct paths share one or more routers. This is common, for example, where multiple devices choose the same parent towards the DAG root.

Adjusting the frame MTU requires agreement on both the transmitter and receiver. To address case 1, node A needs to know the kind of traffic it may source and adjusts the frame MTU for its own transmissions accordingly. However, to address cases 2 and 3, the receiver (node B) must understand the kind of traffic it may receive, adjust the frame MTU accordingly, and notify neighboring nodes of the new frame MTU.

Figure 5A:
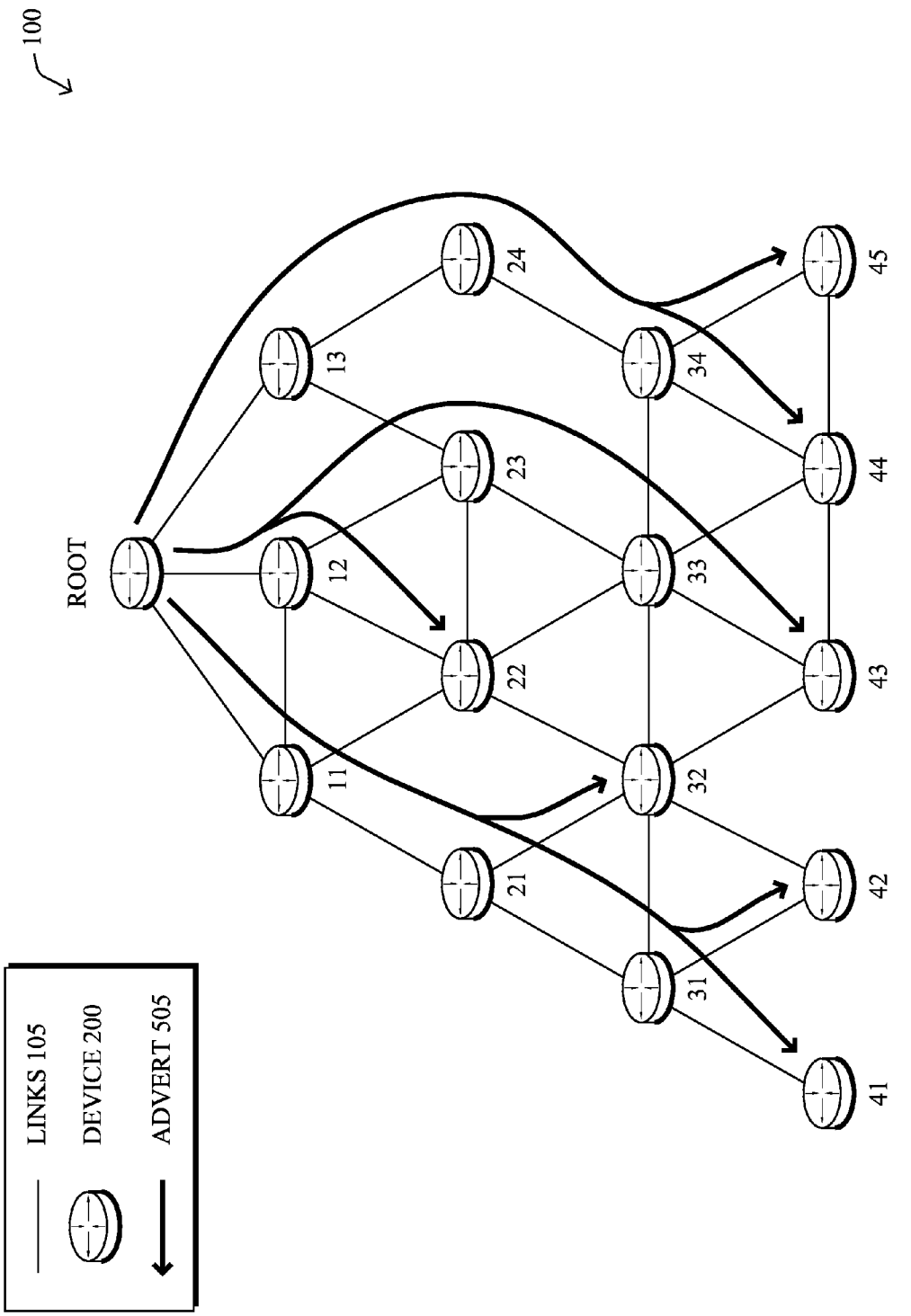
FIGS. 5A-5C illustrate examples of MTU advertisement.

In one embodiment, the frame MTU may be a single network-wide configuration advertised by a management device (e.g., a DAG root), as shown in FIG. 5A (advertisement 505). With IEEE 802.15.4e, the frame MTU may be encoded in an Information Element and included in Enhanced Beacons that are propagated throughout the network.

Figure 5B:
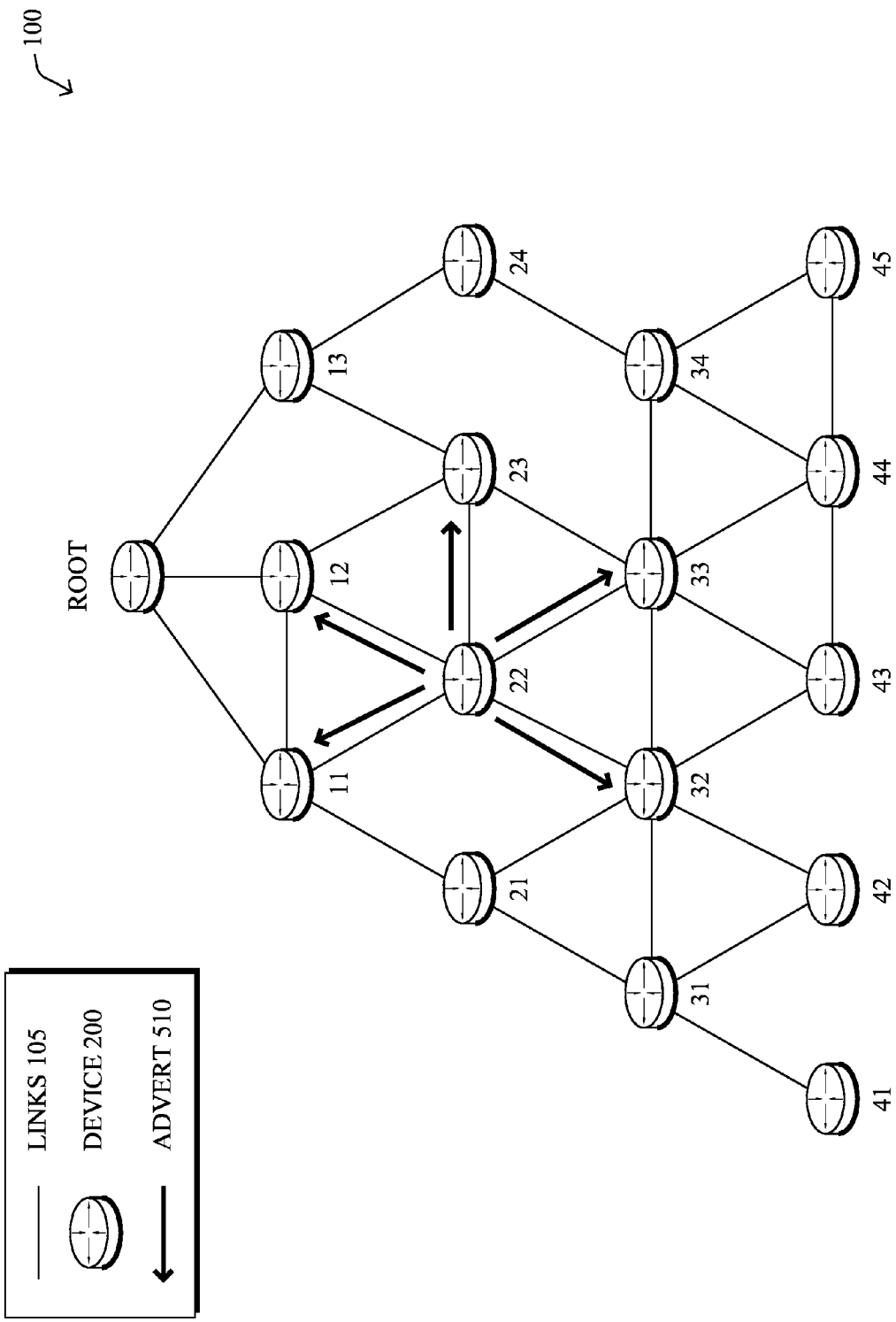
Figure 5C:
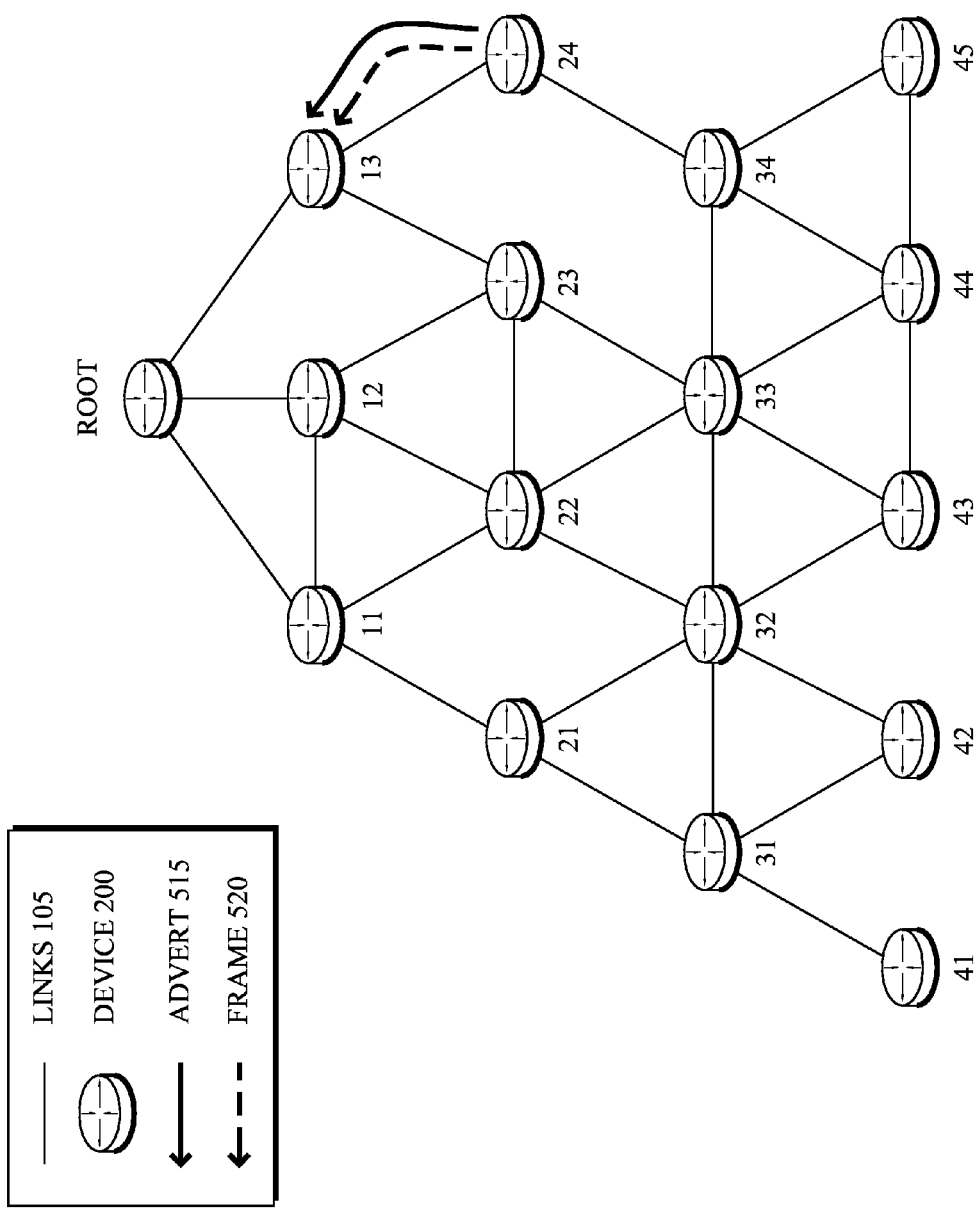

In another embodiment, devices may maintain different frame MTU settings for each neighbor. A device may notify neighboring devices of the frame MTU in a couple ways. In one embodiment, as shown in FIG. 5B, a device may send dedicated control messages 510 that indicate the frame MTU to use for future transmissions to it. In another embodiment, as shown in FIG. 5C, a device may piggyback the frame MTU 515 in existing unicast or broadcast link frames 520. In either case, when using IEEE 802.15.4e-2012 frames, the frame MTU maybe encoded using a newly defined Information Element.

A second aspect of the techniques herein involves interrupting the transmitter when a device has critical, low-latency traffic to send. In case 1, where the device transmitting latency-tolerant traffic is also sourcing the low-latency traffic, the device merely waits for the current transmission to complete and transmit low-latency packets beginning with the next frame. However, with case 2 and 3, the receiver must interrupt the transmitter by sending a message.

To interrupt a transmitter, the techniques herein use a newly defined 'interrupt' flag in link-layer acknowledgments. The interrupt flag in link-layer acknowledgments indicates whether or not the device transmitting packets should pause its transmissions for a short period of time. When a transmitter receives a link-layer acknowledgment with the interrupt flag set, it should pause its transmissions long enough to allow other devices to acquire the channel and transmit low-latency packets.

Significant efforts have been made to support full-duplex communication in RF environments (e.g., by using antenna or balun cancellation to eliminate loop interference). When full-duplex communication becomes available in LLNs, a device may also send an 'interrupt' frame, telling the current transmitter to stop its transmission. This is possible since transceivers that support full-duplex communication can both transmit and receive at the same time.

A third aspect of the techniques herein involves notifying a receiver of pending low-latency transmissions. In case 3 above, while device A is transmitting frames to B, device C must notify device B of pending low-latency transmissions. Device C may not be able to notify device A directly, due to the hidden-terminal problem.

The techniques herein introduce a newly defined (e.g., small) control frame that indicates pending low-latency transmissions. This control frame may be sent between the link-layer acknowledgment sent by device B and the following data frame sent by device A. The control frame should be kept small to minimize necessary delays between receiving a link-layer acknowledgment and the next data frame. When receiving this control frame, device B should set the interrupt flag in its next link-layer acknowledgment. Device C may also receive the link-layer acknowledgment and begin transmitting thereafter. Note that the link-layer acknowledgment sent to A also serves as an acknowledgment of the control message sent by C. As a result, device B does not need to send an explicit acknowledgment after receiving the control message from C. Instead, device C may piggyback on the acknowledgment sent to A.

A fourth aspect of the techniques herein involves having each device determine what frame MTU to use. A device may take input from one or more sources when determining what frame MTU to use. In one embodiment, a central device (e.g., a Network Management System (NMS) or Field Area Router (FAR)) may determine the frame MTU for the entire network. In this case, the central device may choose an acceptable latency bound for the network and adjust the frame MTU for the entire network by broadcasting a message to all devices. Alternatively, the central device may take input about the flows within the network and adjust the frame MTU on individual devices, effectively assigning different frame MTUs to different portions of the network using unicast messages. The central device may base its decision on current and historical observations (e.g., deep packet inspection, traffic matrix, etc.). The central device may adjust the MTU in different parts of the network as the traffic matrix changes or as routes change.

In another embodiment, each individual device may locally determine what frame MTU is acceptable based on control traffic between the source and destination of flows or simply by observing the flows themselves. For either the dedicated control message or piggybacking method, an IPv6 Hop-by-Hop Option header may be used and processed by each router along a path that indicates an acceptable latency.

Figure 6:
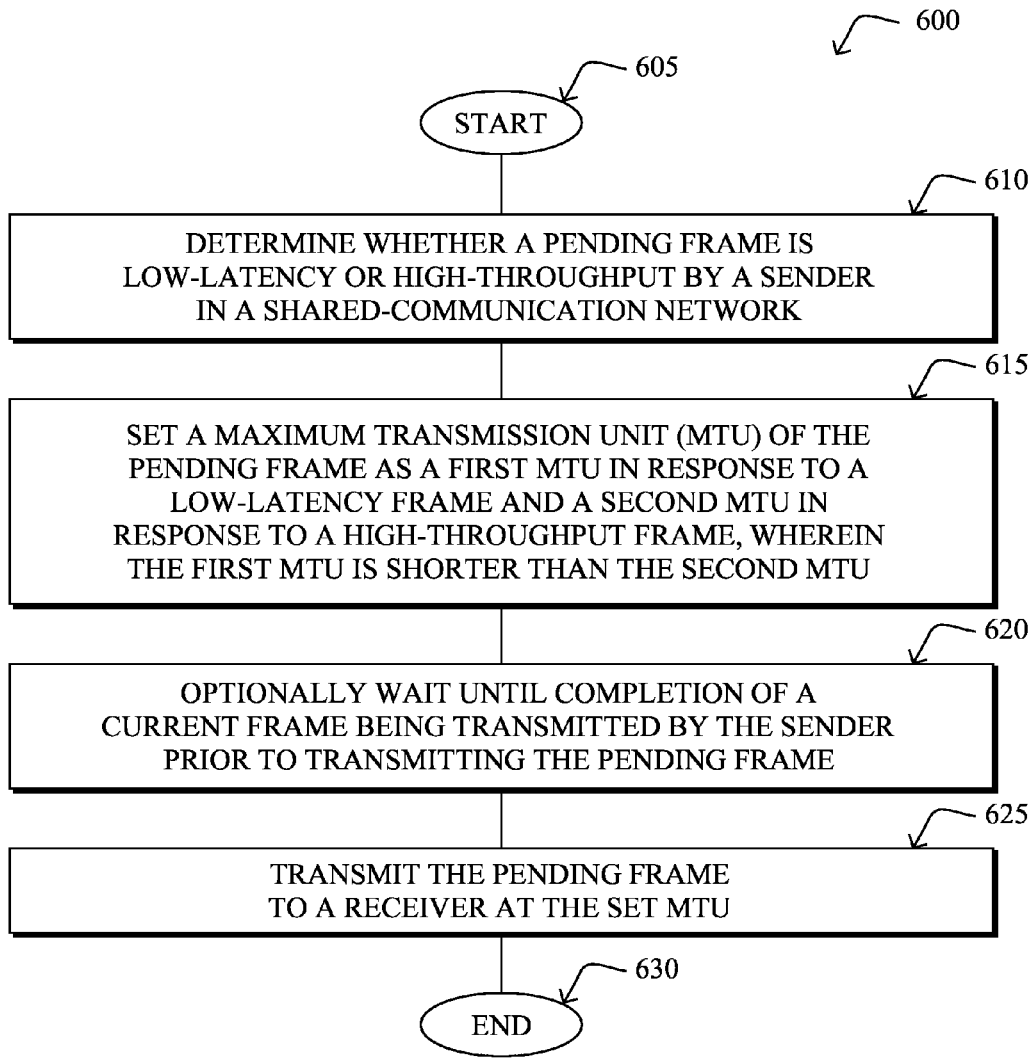
FIGS. 6-8 illustrate example simplified procedures for dynamic adjustment of frame MTU in a shared-media communication network in accordance with one or more embodiments described herein.

FIG. 6 illustrates an example simplified procedure 600 for dynamic adjustment of frame MTU in a shared-media communication network in accordance with one or more embodiments described herein. The procedure 600 may start at step 605, and continues to step 610, where, as described in greater detail above, a sender (e.g., A in FIG. 4A) determines whether a pending frame is low-latency or high-throughput, and sets an MTU of the pending frame in step 615 as a first MTU in response to a low-latency frame and a second MTU in response to a high-throughput frame, where the first MTU is shorter than the second MTU. Notably, as described above, the second MTU may be received from a management device or set individually, and may be different for each neighbor pair in the network. In step 620, the sender may optionally wait until completion of a current frame being transmitted by the sender prior to transmitting the pending frame to a receiver (e.g., B) at the set MTU in step 625, and the simplified procedure ends in step 630.

Figure 7:
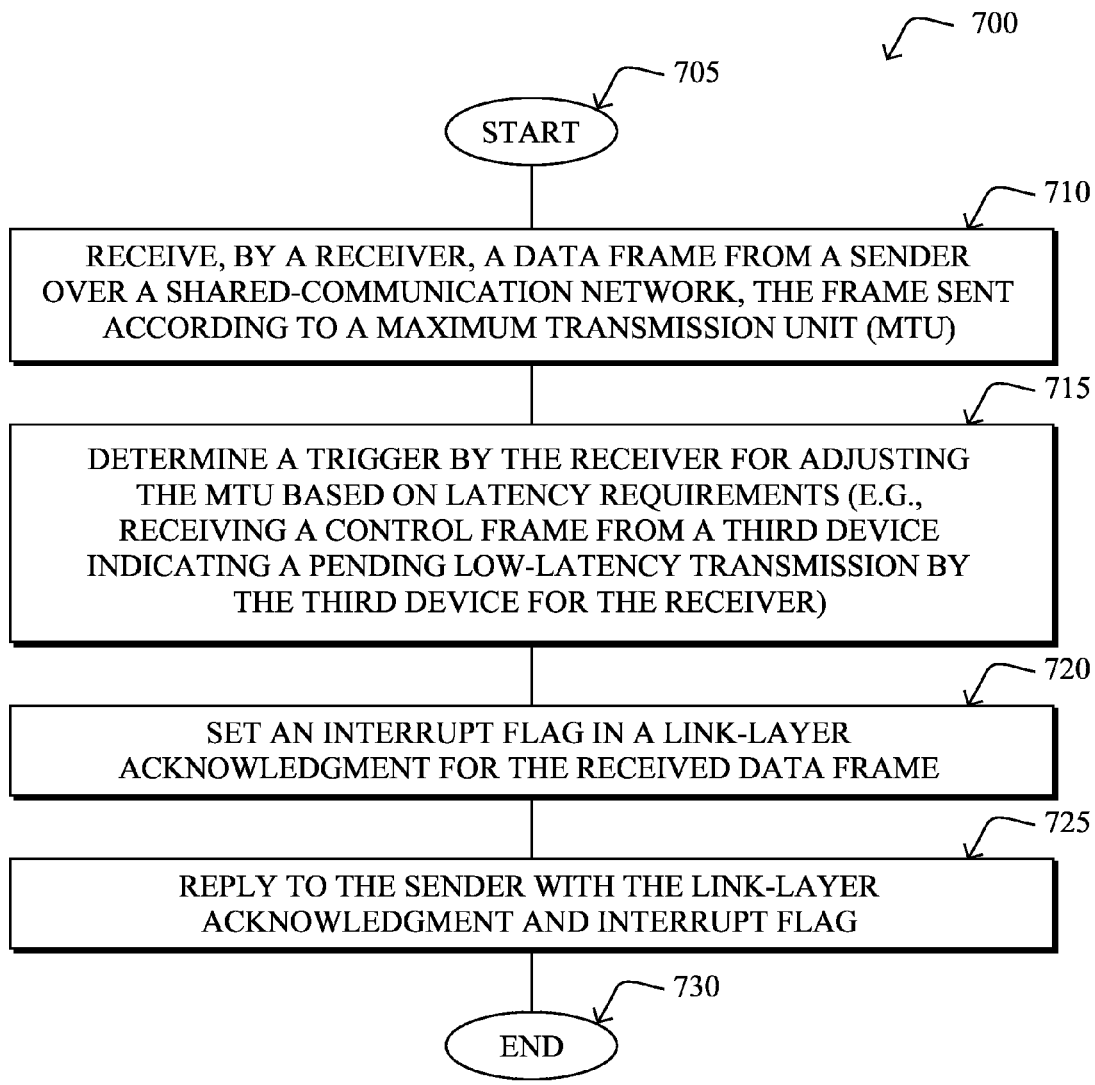

In addition, FIG. 7 illustrates another example simplified procedure 700 for dynamic adjustment of frame MTU in a shared-media communication network in accordance with one or more embodiments described herein. The procedure 700 may start at step 705, and continues to step 710, where, as described in greater detail above, a receiver (e.g., B in FIG. 4B) receives a data frame from a sender (e.g., A) according to an MTU, yet in step 715 determines a trigger for adjusting the MTU based on latency requirements (e.g., a critical low-latency frame to be sent by the receiver in FIG. 4B or receiving a control frame from a third device C in FIG. 4C indicating a pending low-latency transmission by the third device for the receiver). Accordingly, in step 720 the receiver sets an interrupt flag in a link-layer acknowledgment for the received data frame, and replies to the sender with the link-layer acknowledgment and interrupt flag in step 725. Notably, as mentioned above, the receiver and sender may operate in either a half-duplex mode or a full-duplex mode, and as such, replying in step 725 may occur in response to completion of the received data frame from the sender in half-duplex mode, or else prior to completion of the received data frame from the sender in full-duplex mode. The simplified procedure 700 then ends in step 730.

Figure 8:
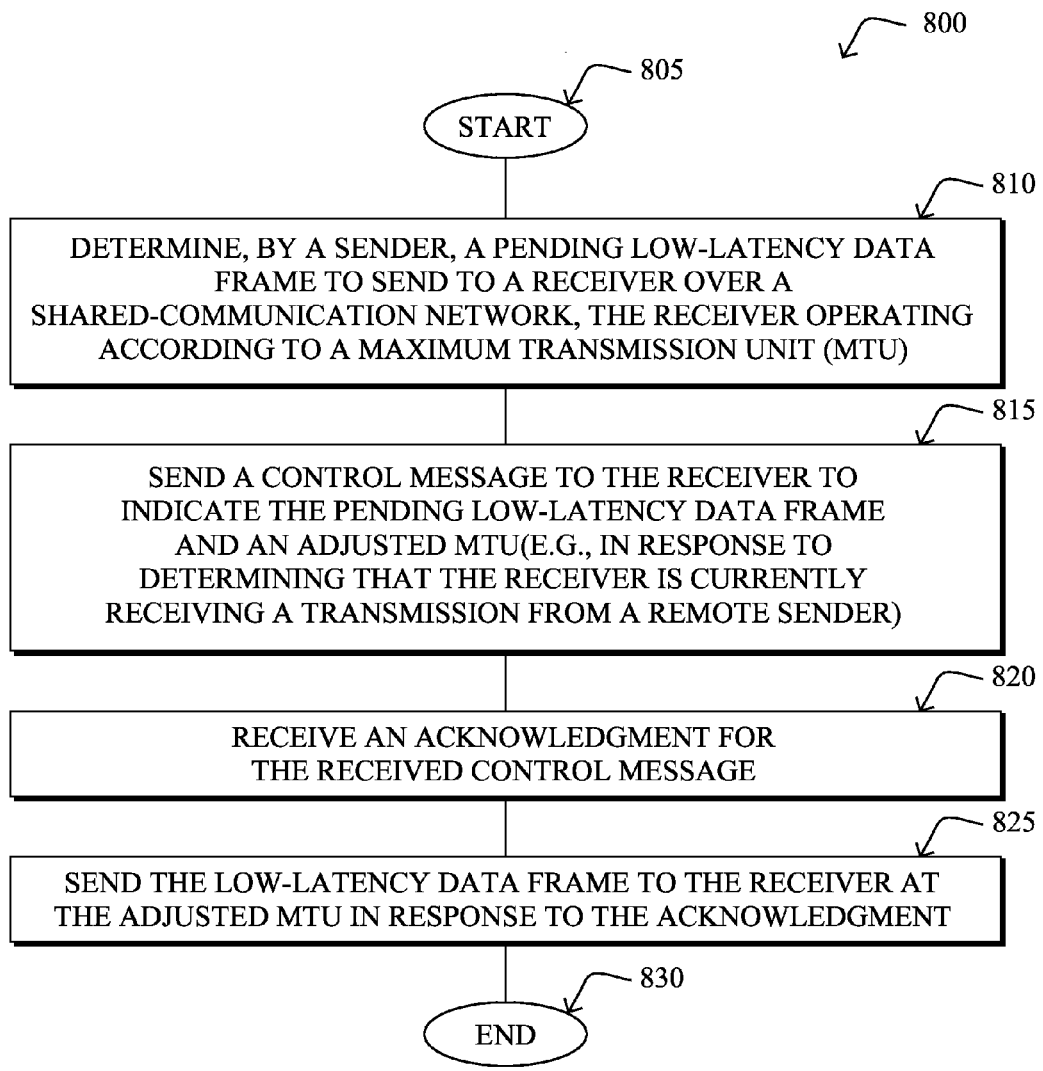

Still further, FIG. 8 illustrates an example simplified procedure 800 for dynamic adjustment of frame MTU in a shared-media communication network in accordance with one or more embodiments described herein. The procedure 800 may start at step 805, and continues to step 810, where, as described in greater detail above, a sender (e.g., C in FIG. 4C) determines a pending low-latency data frame to send to a receiver (e.g., B) over a shared-communication network, where the receiver is operating according to an MTU. The sender may then send a control message to the receiver in step 815 to indicate the pending low-latency data frame and an adjusted MTU (e.g., in response to determining that the receiver is currently receiving a transmission from a remote sender, e.g., A). Note that sending the control message may be in response to hearing an acknowledgment sent from the receiver (B) to a remote transmitting device (A) (e.g., in half-duplex mode), or else may be prior to completion of the transmission from A to B. Once the sender (e.g., C) receives an acknowledgment for the received control message in step 820 (such as an explicit acknowledgment from B to C, or else a link-layer acknowledgment having a set interrupt flag sent from the receiver B to a remote transmitting device A which was overheard by the sender C), then in step 825 the sender may send the low-latency data frame to the receiver at the adjusted MTU, an the simplified procedure 800 ends in step 830.

It should be noted that while certain steps within procedures 600-800 may be optional as described above, the steps shown in FIGS. 6-8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-800 are described separately, certain steps from each procedure may be incorporated into each other procedure, and the procedures are not meant to be mutually exclusive.

The techniques described herein, therefore, provide for dynamic adjustment of frame MTU in a shared-media communication network. In particular, the techniques herein dynamically adjust the frame MTU to trade between throughput and latency to address latency requirements for different application flows. Certain LLN systems require support for low-latency communication (e.g., less than 40 ms for some applications), so adjusting the frame MTU along with some minimal control messaging as described herein allows LLNs to address different latency requirements.

TDMA is often proposed as a solution for allocating channel capacity and bounding latency. Time Synchronized Mesh Protocol (TSMP) is a TDMA system that relies on a global schedule. IEEE 802.15.4-2003 also defines a form of TDMA in the Beacon-Enabled mode with Guaranteed Time Slots (GTS). The primary downside of TDMA systems is that reserved time slots incur high overhead when they are not used. In many cases, critical events are often rare and it is not necessary to allocate the additional channel capacity even while reserving time slots also serves to bound latency. In contrast to TDMA-based approaches, the techniques herein dynamically adjust the frame MTU so that high-priority traffic can acquire the channel with lower latency. Furthermore, the techniques herein do not require global time synchronization and do not require scheduling communications across all devices within a network. Instead, using the techniques herein, nodes may locally adjust the frame MTU based on the observed flows.

Also, priority-based mechanisms for CSMA/CA are typically based on varying the random backoff period based on the packet priority. IEEE 802.11 (using CSMA/CARP), IEEE P1901.2, and others include mechanisms that vary the backoff based on the packet priority. Adjusting the random backoff is not sufficient to reduce latency since a new transmission cannot preempt a transmission that is already occurring, a major challenge in presence of large frames. In contrast to existing priority-based mechanisms, the techniques herein dynamically adjust the frame MTU to trade between throughput and latency.

While there have been shown and described illustrative embodiments that provide for dynamic adjustment of frame MTU in a shared-media communication network based on the latency requirements, it is to be understood that various other adaptations and modifications may be made within the spirit and scope of the embodiments herein. For example, the embodiments have been shown and described herein with relation to LLNs. However, the embodiments in their broader sense are not as limited, and may, in fact, be used with other types of shared-media networks and/or protocols. In addition, while certain specific protocols are shown, such as RPL, 802.15.4, etc., other suitable protocols may be used, accordingly.

Note also, that while the techniques herein are generally described in terms of a longer high-throughput MTU being the default MTU, and the adjusted MTU being the shorter low-latency MTU, the techniques herein may also allow for the default MTU to be the low-latency MTU, and when a device needs to send a high-throughput frame, it may adjust the MTU to the longer MTU in a similar manner to the techniques described above.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    receiving, by a receiver, a data frame from a sender over a shared-communication network, the frame sent according to a maximum transmission unit (MTU), wherein the MTU is a frame MTU that limits an amount of time that the data frame occupies a particular channel;
    determining, by the receiver, whether the MTU needs to be dynamically adjusted by the sender based on latency requirements of flows that the receiver or a neighboring device of the receiver is servicing, wherein the receiver and sender operate in either a half-duplex mode or a full-duplex mode;
    based on a determination that the MTU needs to be dynamically adjusted by the sender, adjusting the MTU by setting an interrupt flag in a link-layer acknowledgment for the received data frame, wherein the MTU is reduced when urgent traffic needs to be serviced by the receiver or a neighboring device and the MTU is increased when urgent traffic does not need to be serviced by the receiver or a neighboring device; and
    replying to the sender with the link-layer acknowledgment and interrupt flag, wherein replying occurs in response to completion of the received data frame from the sender in half-duplex mode, and prior to completion of the received data frame from the sender in full-duplex mode.

2. The method as in claim 1, wherein the urgent traffic is a critical low-latency frame.

3. The method as in claim 1, wherein determining whether the MTU needs to be dynamically adjusted by the sender comprises:
    receiving a control frame from a third device indicating a pending low-latency transmission by the third device for the receiver.

4. The method as in claim 1, further comprising:
receiving the MTU from a management device.

5. The method as in claim 1, further comprising:
setting the MTU individually.

6. The method as in claim 1, wherein the MTU is different for each neighbor pair in the network.

7. A method, comprising:
determining, by a sender, whether a pending data frame to send to a receiver over a shared-communication network is low-latency, the receiver operating according to a maximum transmission unit (MTU), wherein the MTU is a frame MTU that limits an amount of time that the data frame can occupy a particular channel, wherein the receiver operates in either a half-duplex mode or a full-duplex mode;
in response to the pending data frame being an urgent data frame, dynamically adjusting, by the sender, the MTU to account for the pending data frame, wherein the MTU is reduced when urgent traffic exists and is increased when urgent traffic does not exist;
sending a control message to the receiver to indicate the pending data frame is latency critical and an adjusted MTU, wherein sending the control message occurs in response to hearing an acknowledgment sent from the receiver to a remote transmitting device in half-duplex mode, and prior to completion of a transmission from a remote transmitting device to the receiver in full-duplex mode;
receiving an acknowledgment for the received control message; and
sending the urgent data frame to the receiver at the adjusted MTU in response to the acknowledgment.

8. The method as in claim 7, wherein the acknowledgment is a link-layer acknowledgment having a set interrupt flag sent from the receiver to a remote transmitting device and overheard by the sender.

9. The method as in claim 7, wherein sending the control message is in response to hearing an acknowledgment sent from the receiver to a remote transmitting device.

10. The method as in claim 7, further comprising:
receiving the MTU from a management device.

11. The method as in claim 7, further comprising:
setting the MTU individually.

12. The method as in claim 7, wherein the MTU is different for each neighbor pair in the network.

13. A method, comprising:
determining whether a pending frame is urgent or not by a sender in a shared-communication network;
dynamically adjusting a maximum transmission unit (MTU) of the pending frame as a first MTU in response to the pending frame being urgent and a second MTU in response to the pending frame not being urgent, wherein the first MTU is shorter than the second MTU, wherein the first MTU reduces the overall throughput and the second MTU increases the overall throughput and wherein the first and second MTUs are frame MTUs that limit an amount of time that the pending frame can occupy a particular channel;
setting the second MTU individually, wherein the second MTU is different for each neighbor pair in the network; and
transmitting the pending frame to a receiver at the dynamically adjusted MTU.

14. The method as in claim 13, further comprising:
waiting until completion of a current frame being transmitted by the sender prior to transmitting the pending frame.

15. The method as in claim 13, further comprising:
receiving the second MTU from a management device.

16. The method as in claim 13, wherein determining whether the pending frame is urgent or not is based on a neighboring device receiving on a same channel as the frame at the same time.

17. An apparatus, comprising:
one or more network interfaces to communicate in a shared-media communication network;
a processor coupled to the network interfaces and adapted to execute one or more processes; and
a memory configured to store a process executable by the processor, the process when executed operable to:
determine whether a pending frame of the apparatus is urgent or not;
in response to a determination that the pending frame is urgent, dynamically adjust a maximum transmission unit (MTU) of the pending frame as a first MTU in response to the pending frame being urgent and as a second MTU in response to the pending frame not being urgent, wherein the first MTU is shorter than the second MTU, wherein the first MTU reduces the overall throughput and the second MTU increases the overall throughput and wherein the first and second MTUs are frame MTUs that limit an amount of time that the pending frame can occupy a particular channel;
set the second MTU individually, wherein the second MTU is different for each neighbor pair in the network; and
transmitting the pending frame to a receiver at the dynamically adjusted MTU.

18. The apparatus as in claim 17, wherein the process when executed is further operable to:
receive an incoming data frame from a sender according to the sender's MTU;
determine whether to adjust the sender's MTU based on latency requirements;
based on a determination that the sender's MTU needs adjustment, set an interrupt flag in a link-layer acknowledgment for the incoming data frame; and
reply to the sender with the link-layer acknowledgment and interrupt flag.

19. The apparatus as in claim 17, wherein the process when executed is further operable to:
determine that the pending frame is urgent;
determine that the receiver is currently receiving a transmission from a remote sender;
send a control message to the receiver to indicate the pending urgent frame and the first MTU; and
sending the urgent frame to the receiver at the first MTU in response to an acknowledgment for the control message.

20. The apparatus as in claim 17, wherein the process when executed to determine whether the pending frame is urgent or not is further operable to:
determine whether the pending frame is urgent or not based on a neighboring device receiving on a same channel as the frame at the same time.

* * * * *